Jan. 5, 1926.
E. BEHRINGER
1,568,440
COMBINATION WATER HEATER
Filed Jan. 20, 1922  2 Sheets-Sheet 2
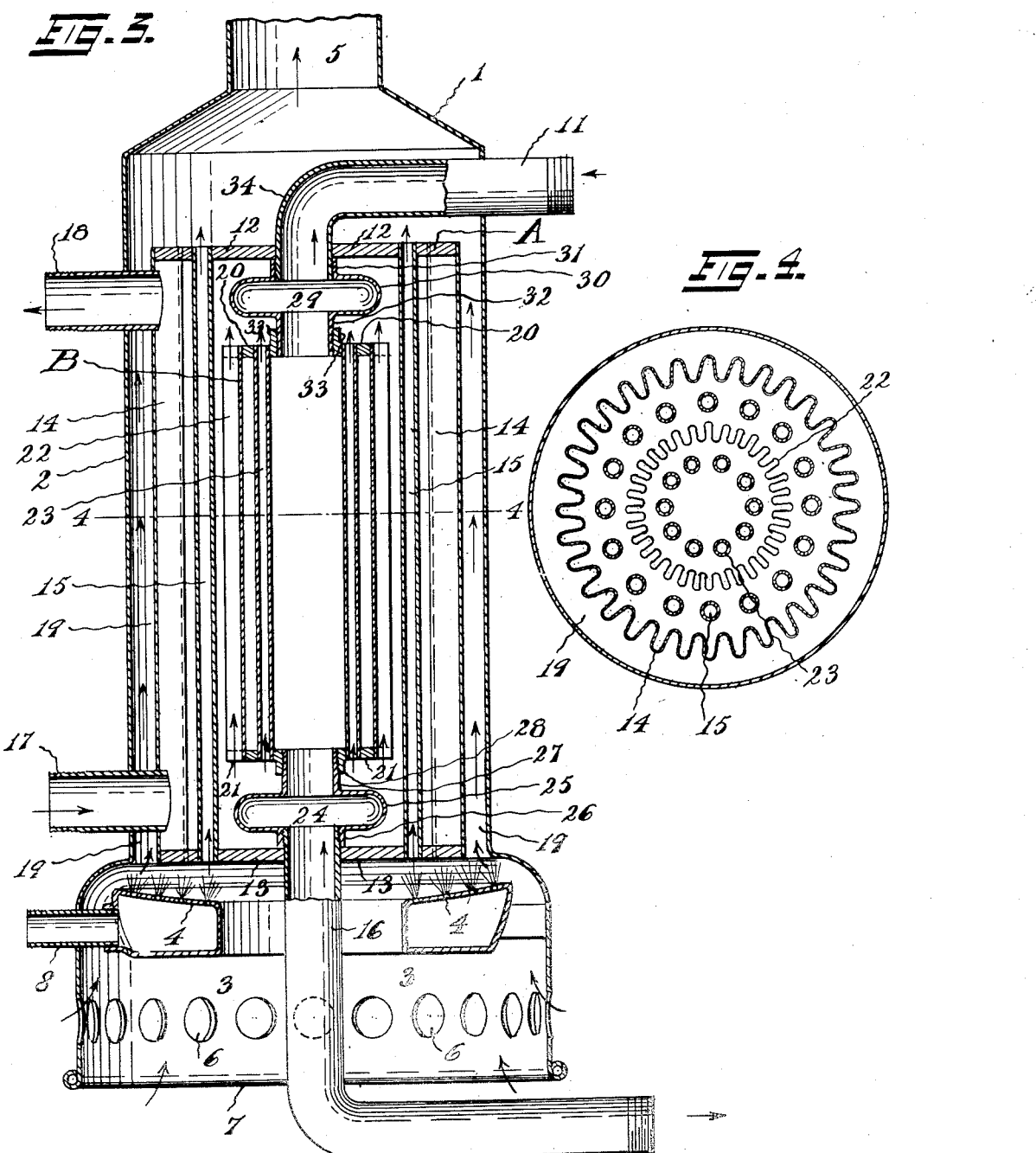
Witnesses:
L. C. Badeau
H. D. Penney
Inventor:
Emil Behringer,
By his Att'y, P. W. Richards.

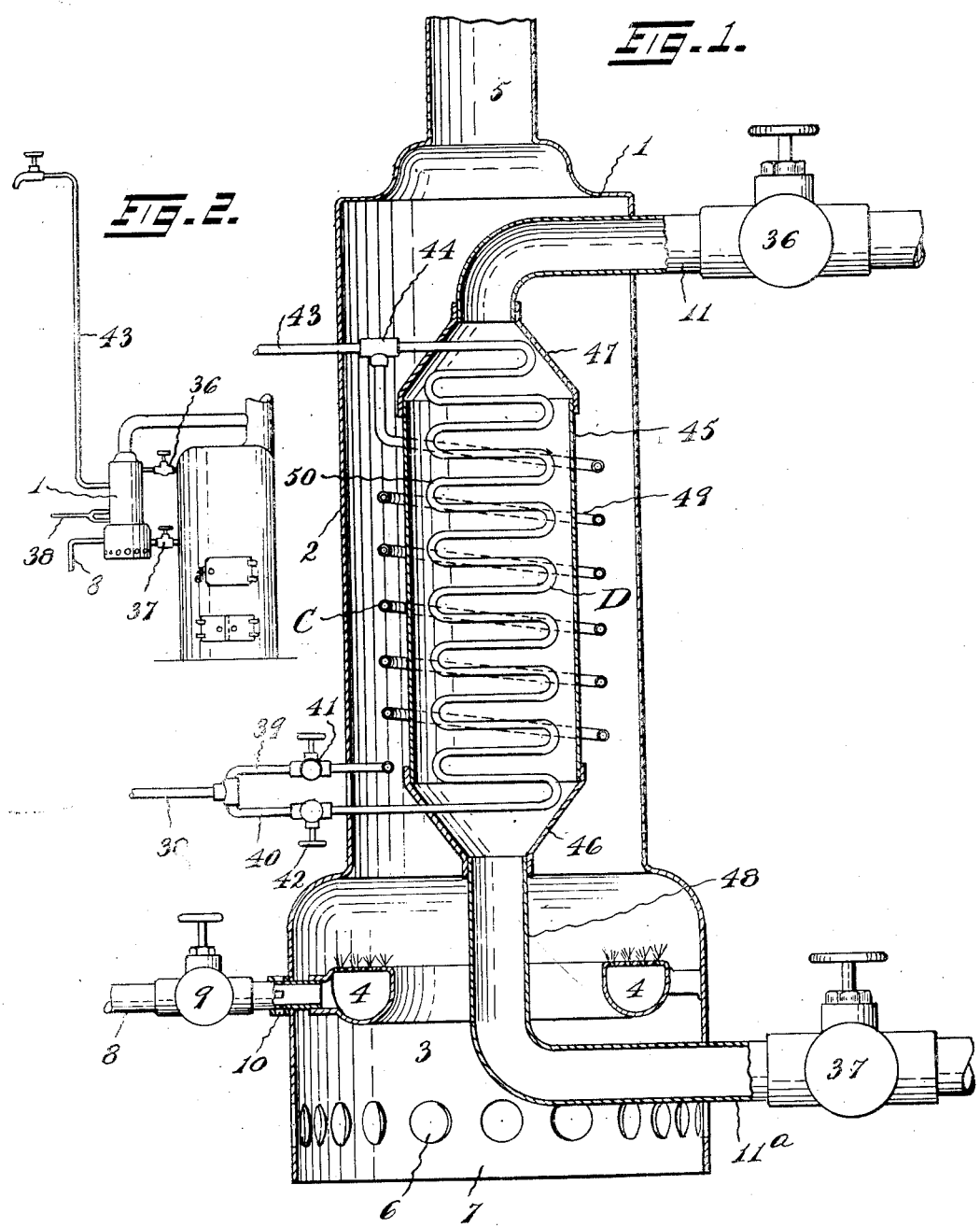

Patented Jan. 5, 1926.

UNITED STATES PATENT OFFICE.

EMIL BEHRINGER, OF BROOKLYN, NEW YORK.

COMBINATION WATER HEATER.

Application filed January 20, 1922. Serial No. 530,559.

*To all whom it may concern:*

Be it known that I, EMIL BEHRINGER, a citizen of the United States, residing in Brooklyn, in the county of Kings and State of New York, have invented certain new and useful Improvements in Combination Water Heaters, of which the following is a specification.

My present invention relates to an improvement in heaters for heating water more especially for household, apartment house, hotel, or the like uses, wherein the mechanism is so devised as to permit of the use of heat from various desired sources for heating the water, and whereby either desired source for heating the water may be utilized for meeting normal conditions in the use of the heated water; or where one source of heat is the steam or other heating means of a building, ordinarily operating in cold weather, the other source of heating, such as gas, may be utilized in mild weather or in the summer, or both sources of heating may be utilized at the same time to obtain hot water quickly in large volumes.

In the drawings which show two of the possible embodiments of the invention, and which form part of this specification, Figure 1, is a longitudinal sectional view of one form of my device, showing the interior assembly.

Figure 2, is a side elevation, on a reduced scale, showing the invention in association with a heating means such as a steam heating boiler located relatively remotely from the device, which provides one of the sources for supplying heat to the device, the arrangement being applicable to either form of the device.

Figure 3, is a longitudinal sectional view of another form of the device, showing the interior assembly, and Figure 4, is a sectional view on the line 4—4 of Fig. 3.

Similar reference characters denote similar parts throughout the several views.

Referring to the form of the device shown in Fig. 3, my hot water heater comprises an outer casing 1 forming a casing or container for related parts of the device. Said container comprises the main or body portion 2, preferably cylindrical, having at its lower end the enlarged, preferably cylindrical, chamber 3, wherein to mount the gas burner 4, the casing having at its upper end the flue 5 for taking away the products of combustion when the gas burner 4 is used. The chamber 3 is provided with the air inlets 6, the chamber 3 being open to the atmosphere at its bottom 7, gas being admitted to the burner 4, which is of a well known type, by the pipe 8, controlled by the customary valve 9 and the usual mixing valve 10, such as shown in Fig. 1.

Within the main or body portion 2 of the casing or container the outer water circulation and heating system generally denoted by A, and the inner water circulation and heating system generally denoted by B are arranged, the system A preferably being heated by gas, as by the burner 4, and the system B preferably being heated by steam or heat as by the pipe or conduit 11, connected to a suitable steam or other form of building heating means.

The outer water circulation and heating system A comprises the circular upper and lower head pieces or headers 12 and 13 having tightly secured therein, by welding or in other suitable manner, the cylindrical convoluted member 14 and the stand of pipes 15, the pipes 15 being open at top and bottom. The system A is supported at its lower end by the upwardly extending bent end 16 of the pipe or conduit 11ª, the lower header 13 being tightly secured thereto at the center of the lower header, the pipe or conduit 11ª serving as a supporting means. Cold water from a suitable source of supply is introduced into the system A by the pipe or conduit 17 and is discharged therefrom as hot water for conveyance by suitable means to the point of use by the pipe or conduit 18, the pipes or conduits 17 and 18 extending through the body portion 2 of the casing and through the convoluted member 14. The lower header 13 is secured to the pipe or conduit end 16 at the top of the chamber 3 and adjacent to the gas burner 4. Heat and combustion gases from this burner pass through the space or passage 19 provided between the inner side of the body portion 2 and the outer side of the convoluted member 14, and through the pipes 15 and thence in both instances to the flue, while water passes along the inner side of the convoluted member 14 and through the interior of the body portion 2 and through pipes of the system B later described, and is discharged by the pipe or conduit 18, the heat from the burner 4 contacting with the convolutions of the member 14 on the outer side of said member for greater radiation of the heat, the water passing along or conformably to the convolutions of said member on the inner side of said member and surrounding the pipes 15 and being heated thereby.

The inner water circulation and heating system B comprises the upper and lower circular head pieces or headers 20 and 21, having tightly secured therein by welding or in other suitable manner the cylindrical convoluted member 22 and the stand of pipes 23, the pipes 23 being open at top and bottom. The system B is supported in the body portion 2 interiorly of the system A by the lower pipe or conduit expansion connection or joint 24 having an enlarged middle portion 25 and extending ends 26 and 27, the end 26 being tightly secured to the bent end of the pipe or conduit 11ᵃ on the inner side of the header 13 of the system A and the end 27 being tightly secured to the annular extension 28 of the lower header 21 of the system B.

The upper header 20 of the system B is supported by the upper pipe or conduit connection or joint 29, having an enlarged middle portion 30 and extending ends 31 and 32, the end 32 being tightly secured to the annular extension 33 of the header 20, and the end 31 being tightly secured to the lower portion of the bent end 34 of the steam inlet pipe or conduit 11 which pipe or conduit passes through the casing 2 and through the central portion of the upper header 12 of the system A, the header 20 being tightly secured to the pipe or conduit 11 and supported thereby. Expansion and contraction of the parts comprising the system B is provided for by the enlarged portions 25 and 30 of the connections or joints 24 and 29 which will flex when the convoluted member 22 and the pipes 23 expand or contract longitudinally.

Also the end portions of the system B, as at 24 and 29, provide means for collecting heat adjacent to the cold water inlet and adjacent to the place of commingling and discharge of the heated water from the apparatus, thus tending to heat the incoming cold water and to maintain the heat of the commingled water.

It will be noted that by use of the gas burner 4, and exclusion of heat from the pipe or conduit 11, the water circulation appurtenant to the system A will be directly or primarily heated, and the water circulation appurtenant to the system B will be indirectly or secondarily heated by the burner 4, with the result of general heating of the water circulation of both the systems A and B for the purpose desired. And that by use of steam or other heat from the pipe or conduit 11, and exclusion of heat from the burner 4, the water circulation appurtenant to the system A will be directly or primarily heated and the water circulation appurtenant to the system B will be indirectly, or secondarily heated by heat from the pipe or conduit 11, with the result of general heating of the water circulation of both the systems B and A for the purpose desired. By use of both the burner 4 and heat from the pipe or conduit 11 the water circulation of both systems may be heated at the same time with the result of a general speedy heating of the water circulation of both systems and provision of great volumes of heated water.

Referring to the form of the device shown in Fig. 1, the casing 1 and body portion 2, open bottomed chamber 3, burner 4, flue 5, valved pipe 8, steam or heat inlet pipe or conduit 11, and steam or heat outlet pipe or conduit 11ᵃ, are similar in construction and arrangement to those parts as shown in Fig. 3. The pipes or conduits 11 and 11ᵃ, in Fig. 1, however, are shown with the control valves 36 and 37, with which valves, it should be understood the form of the device shown in Fig. 3, is also provided.

The cold water supply pipe 38 is arranged on one side of the body portion 2 of the casing near the bottom thereof, the pipe 38 being bifurcated adjacent to the body portion 2, the respective 39 and 40 ends of this pipe being provided with the control valves 41 and 42, the ends 39 and 40 extending through the body portion 2.

The cylindrical chamber providing member 45 is located centrally within the body portion 2 of the casing longitudinally of the body portion and has contracted ends 46 and 47, the end 46 being tightly secured to the upwardly bent end 48 of the pipe or conduit 11ᵃ, and the end 47 being tightly secured to the downwardly bent end of the pipe or conduit 11, the member 45 being supported by the respective ends of the pipes or conduits 11 and 11ᵃ.

It will be noted that the end portions 46 and 47 of the member 45 provide means for collecting heat adjacent to the cold water inlet and adjacent to the place of commingling and discharge of the heated water for the purpose similar to the end portions 24 and 29 before mentioned.

Within the main or body portion 2 of the casing or container the outer water circulation and heating system generally denoted by C, and the inner water circulation and heating system generally denoted by D, are arranged, the system C being heated preferably by gas as by the burner 4, and the system D preferably being heated by steam or heat, as by the conduit 11 connected to a suitable steam or other form of building heating means.

The outer water circulation and heating system C comprises the pipe coil 49, which passes around the exterior of the cylindrical member 45 longitudinally thereof, the lower end of the pipe coil 49 being connected to the extended end 39 of the supply pipe 38, and the upper end of the pipe coil being secured in the connecting member 44 for conveyance of hot water from the pipe coil to the point of use. The pipe coil 49 is heated by the burner 4, the heat passing upwardly through the interior of the body portion 2 of the casing and around and in direct contact with the pipe coil, the products of combustion of the burner being carried off by the flue 5.

The inner water circulation and heating system D comprises the serpentine or sinuous pipe 50, arranged in the interior of the cylindrical member 45 longitudinally thereof. And it is within the purview of the invention that the pipe 50 may be a pipe coil instead of the serpentine form shown. The lower end of the pipe 50 is connected to the end 40 of the supply pipe 38, and the upper end of the pipe 50 is secured in the connecting member or joint 44 for conveyance of hot water from the pipe 50 to the point of use.

The serpentine pipe 50 is heated by steam or heat from the pipe or conduit 11, this steam or heat passing downwardly through the interior of the cylindrical member 45, the used steam or heat being carried off by the pipe or conduit 11ª and returned to its source.

It will be noted that by use of the gas burner 4, and exclusion of heat from the pipe or conduit 11, both the valves 41 and 42 being open, the water in the pipe coil 49 will be directly or primarily heated, and the water in the serpentine pipe 50 will be indirectly or secondarily heated by the burner 4, with the result of general heating of the water in the pipe coil 49 and serpentine pipe 50 for the purpose desired.

And that by the use of heat from the pipe or conduit 11, and exclusion of heat from the burner 4, both the valves 41 and 42 being open, the water in the serpentine pipe 50 will be directly or primarily heated, and the water in the pipe coil 49 will be indirectly or secondarily heated by steam or heat from the pipe or conduit 11, with the result of general heating of the water in the pipe 50 and coil pipe 49 for the purpose desired.

By use of both the burner 4 and heat from the pipe or conduit 11, the water in the pipe coil 49, and serpentine pipe 50 may be heated at substantially the same time, with the result of a general speedy heating of the water in said pipe coil and serpentine pipe and provision of great volumes of heated water.

By closing either of the valves 41 or 42, and excluding the heat from the burner 4 or pipe or conduit 11 as the case requires, either the system C or system D may be caused to operate as a unitary system.

Having thus described my invention, it should be understood that there may be modifications thereof and variations therein without departing from the spirit of the invention or exceeding the scope of the appended claims.

What I claim and desire to protect by Letters Patent is:—

1. In apparatus for heating water, the combination with an outer casing constituting a heating chamber, of a burner in the lower end of said casing, a conduit for the medium to be heated cylindrically disposed in said outer casing and exposed to, and above, said burner, there being an inlet and an outlet provided for said conduit to permit the medium to be heated to pass into and out of said conduit, a second conduit for the medium to be heated disposed centrally of said first conduit and spaced from, and separated from direct exposure to said burner, and a third conduit for a heating medium conducting the heating medium into intimate engagement with said second conduit.

2. In apparatus for heating water the combination of an outer casing, a pair of headers extending transversely of the casing and spaced apart, a side wall member connecting the headers for forming a chamber in the casing, open ended pipes extending longitudinally of said chamber and passing through the headers, a furnace at one end of said chamber for generating heat to pass through said pipes, means for intake and for outlet passing through said headers for conveyance of heat derived from a source outside of the apparatus, a second pair of headers extending transversely of said chamber and spaced apart and supported by said intake and outlet means, a side wall member connected at its ends to the second pair of headers for forming a chamber within the first chamber, open ended pipes extending longitudinally of the second chamber and passing through the second pair of headers and communicating with the first chamber, means for supply of water to the first chamber at one end thereof and means for outlet of heated water at the opposite end thereof, the water passing into the first chamber and through the open ended pipes of the second chamber and commingling at one end of the second chamber with the water of the first chamber for passage through the outlet of the first chamber for heated water.

3. In apparatus for heating water the combination of an outer casing, a pair of headers extending transversely of the casing and spaced apart, a convoluted side wall member connecting the headers for forming a chamber in the casing, open ended pipes extending longitudinally of said chamber and passing through the headers, a furnace at one end of said chamber for generating heat to pass through said pipes, means for intake and for outlet passing through said headers for conveyance of heat derived from a source outside of the apparatus, a second pair of headers extending transversely of said chamber and spaced apart and supported by said intake and outlet means, a convoluted side wall member connected at its ends to the second pair of headers for forming a chamber within the first chamber, open ended pipes extending longitudinally of the second chamber and passing through the second pair of headers and communicating with the first chamber, means for supply of water to the first chamber at one end thereof and means for outlet of heated water at the opposite end thereof, the water passing into the first chamber and through the open ended pipes of the second chamber and commingling at one end of the second chamber with the water of the first chamber for passage through the outlet of the first chamber for heated water.

4. In apparatus for heating water the combination of an outer casing, a pair of headers extending transversely of the casing and spaced apart, a convoluted side wall member connecting the headers for forming a chamber in the casing, open ended pipes extending longitudinally of said chamber and passing through the headers, a furnace at one end of said chamber for generating heat to pass through said pipes, means for intake and for outlet passing through said headers for conveyance of heat derived from a source outside of the apparatus, a second pair of headers extending transversely of said chamber and spaced apart and supported by said intake and outlet means, a convoluted side wall member connected at its ends to the second pair of headers for forming a chamber within the first chamber, open ended pipes extending longitudinally of the second chamber and passing through the second pair of headers and communicating with the first chamber, means for supply of water to the first chamber at one end thereof and means for outlet of heated water at the opposite end thereof, said exterior heat outlet having a transversely extending heat collecting portion adjacent to said means for water supply and said exterior-heat intake having a transversely extending heat collecting portion adjacent to said outlet for heated water, the water passing into the first chamber and through the open ended pipes of the second chamber and commingling at one end of the second chamber with the water of the first chamber for passage through the outlet of the first chamber for heated water.

EMIL BEHRINGER.